(12) United States Patent
Takahashi et al.

(10) Patent No.: US 10,766,150 B2
(45) Date of Patent: Sep. 8, 2020

(54) GRIPPING TOOL, GRIPPING SYSTEM, AND EVALUATION METHOD OF GRIPPING PERFORMANCE

(71) Applicant: KABUSHIKI KAISHA TOSHIBA, Minato-ku (JP)

(72) Inventors: Hiromasa Takahashi, Minato (JP); Emiko Ishida, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/360,877

(22) Filed: Mar. 21, 2019

(65) Prior Publication Data

US 2019/0217484 A1 Jul. 18, 2019

Related U.S. Application Data

(63) Continuation of application No. PCT/JP2017/034441, filed on Sep. 25, 2017.

(30) Foreign Application Priority Data

Mar. 13, 2017 (JP) .................................. 2017-047885

(51) Int. Cl.
*B25J 15/06* (2006.01)
*B25J 15/12* (2006.01)

(52) U.S. Cl.
CPC ....... *B25J 15/0616* (2013.01); *B25J 15/0683* (2013.01); *B25J 15/12* (2013.01)

(58) Field of Classification Search
CPC ................ B25J 15/0033; B25J 15/0608; B25J 15/0023; B25J 15/08; B25J 15/0009;
(Continued)

(56) References Cited

U.S. PATENT DOCUMENTS 4,294,424 A * 10/1981 Teissier ................. B25B 11/007
248/205.9
4,561,686 A * 12/1985 Atchley ................. B66C 1/0206
294/188

(Continued)

FOREIGN PATENT DOCUMENTS

JP 2012-176476 9/2012
JP 2013-523478 A 6/2013
(Continued)

OTHER PUBLICATIONS

International Search Report dated Nov. 21, 2017 in PCT/JP2017/034441, filed on Sep. 25, 2017 (with English Translation).
(Continued)

*Primary Examiner* — Stephen A Vu
(74) *Attorney, Agent, or Firm* — Oblon, McClelland, Maier & Neustadt, L.L.P.

(57) ABSTRACT

According to one embodiment, a gripping tool includes a gripper. The gripper is flexible. A plurality of granular materials is provided in an interior of the gripper. The gripping tool grips a workpiece by depressurizing the interior of the gripper in a state in which the gripper is caused to contact the workpiece. A diameter of at least a portion of the granular materials is less than 1774 μm.

13 Claims, 11 Drawing Sheets

(58) Field of Classification Search
CPC ...... B25J 15/0246; B25J 9/14; B25J 15/0616;
B25J 15/12; B25J 15/0683; A61F 2/586;
A61F 2/588
See application file for complete search history.

(56) References Cited

U.S. PATENT DOCUMENTS

| 6,846,029 | B1* | 1/2005 | Ragner | B25B 9/00 |
|---|---|---|---|---|
| | | | | 294/219 |
| 8,882,165 | B2* | 11/2014 | Lipson | B25J 15/0023 |
| | | | | 294/188 |
| 2009/0242719 | A1* | 10/2009 | Carnevali | F16B 47/00 |
| | | | | 248/346.2 |
| 2010/0054903 | A1* | 3/2010 | Jones | B25J 15/0023 |
| | | | | 414/800 |
| 2013/0106127 | A1 | 5/2013 | Lipson et al. | |

FOREIGN PATENT DOCUMENTS

| JP | 2013-220508 A | 10/2013 |
|---|---|---|
| JP | 2016-97496 A | 5/2016 |
| JP | 2018-79561 A | 5/2018 |

OTHER PUBLICATIONS

Written Opinion dated Nov. 21, 2017 in PCT/JP2017/034441, filed on Sep. 25, 2017.

* cited by examiner

GRIPPING TOOL, GRIPPING SYSTEM, AND EVALUATION METHOD OF GRIPPING PERFORMANCE

CROSS-REFERENCE TO RELATED APPLICATIONS

This is a continuation application of International Application PCT/JP2017/034441, filed on Sep. 25, 2017. This application also claims priority to Japanese Application No. 2017-047885, filed on Mar. 13, 2017. The entire contents are incorporated herein by reference.

FIELD

Embodiments described herein relate generally to a gripping tool, and a gripping system, and an evaluation method of gripping performance.

BACKGROUND

There is a gripping tool that grips an object and transfers the object. It is desirable for the gripping performance of the gripping tool to be high. For example, it is desirable to be able to grip various objects having different sizes and/or shapes with a larger force.

DETAILED DESCRIPTION

Figure 1:
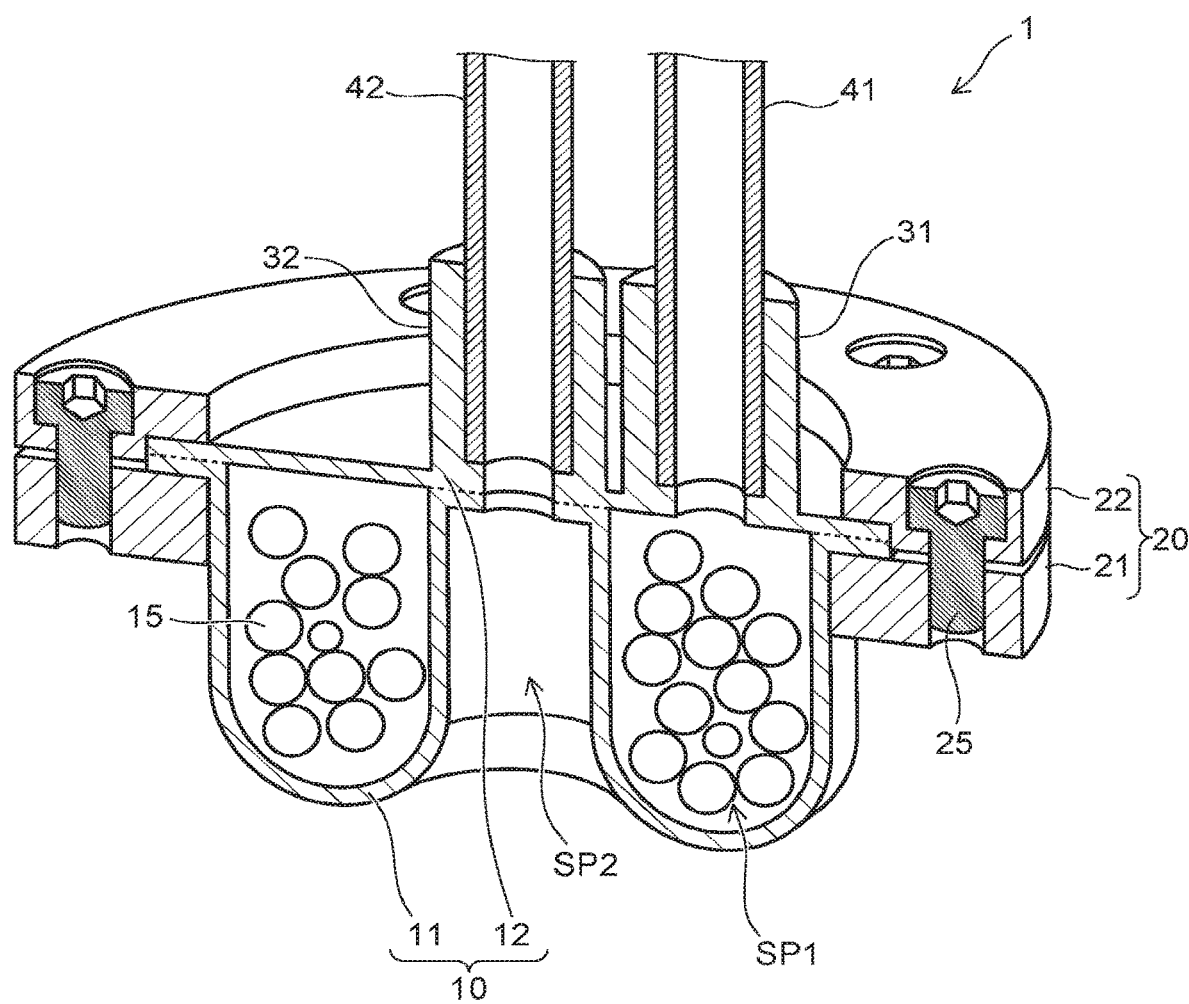
FIG. 1 is a perspective cross-sectional view illustrating a gripping tool according to an embodiment.

According to one embodiment, a gripping tool includes a gripper. The gripper is flexible. A plurality of granular materials is provided in an interior of the gripper. The gripping tool grips a workpiece by depressurizing the interior of the gripper in a state in which the gripper is caused to contact the workpiece. A diameter of at least a portion of the granular materials is less than 1774 μm.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a perspective cross-sectional view illustrating a gripping tool 1 according to an embodiment.

The gripping tool 1 according to the embodiment includes a gripper 10 that is flexible. A granular material 15 is provided in the interior of the gripper 10.

More specifically, the gripper 10 includes a first portion 11 and a second portion 12. The first portion 11 contacts a workpiece to be gripped. The second portion 12 opposes the first portion 11. The first portion 11 and the second portion 12 include flexible materials such as a silicone resin, a rubber material, an acrylic resin, etc. The granular material 15 is provided in a first space SP1 between the first portion 11 and the second portion 12. The gripper 10 is configured by, for example, bonding the first portion 11 and the second portion 12 via a bonding agent. The first portion 11 and the second portion 12 may be bonded by thermal compression bonding.

The outer perimeter of the first portion 11 and the outer perimeter of the second portion 12 are held by a holder 20. Thereby, the first space SP1 is separated from an external space. The holder 20 has, for example, a circular ring configuration. Because only the outer perimeter of the gripper 10 is held by the holder 20, the gripper 10 can deform inside the holder 20 in the direction of a line connecting the first portion 11 and the second portion 12.

The direction of the line connecting the first portion 11 and the second portion 12 is, for example, the vertical direction. The direction of the line connecting the first portion 11 and the second portion 12 includes a first direction (up) from the first portion 11 toward the second portion 12, and a second direction (down) from the second portion 12 toward the first portion 11. Hereinbelow, the description of the embodiments is performed using "vertical direction," "up/above," and "down/below" based on the positional relationship between the first portion 11 and the second portion 12.

As an example, the holder 20 includes a first flange 21 and a second flange 22. The first flange 21 abuts the outer perimeter lower surface of the first portion 11. The second flange 22 abuts the outer perimeter upper surface of the second portion 12. The gripper 10 is held by fastening the first flange 21 and the second flange 22 using a fastener 25 such as a screw, etc.

Figure 2:
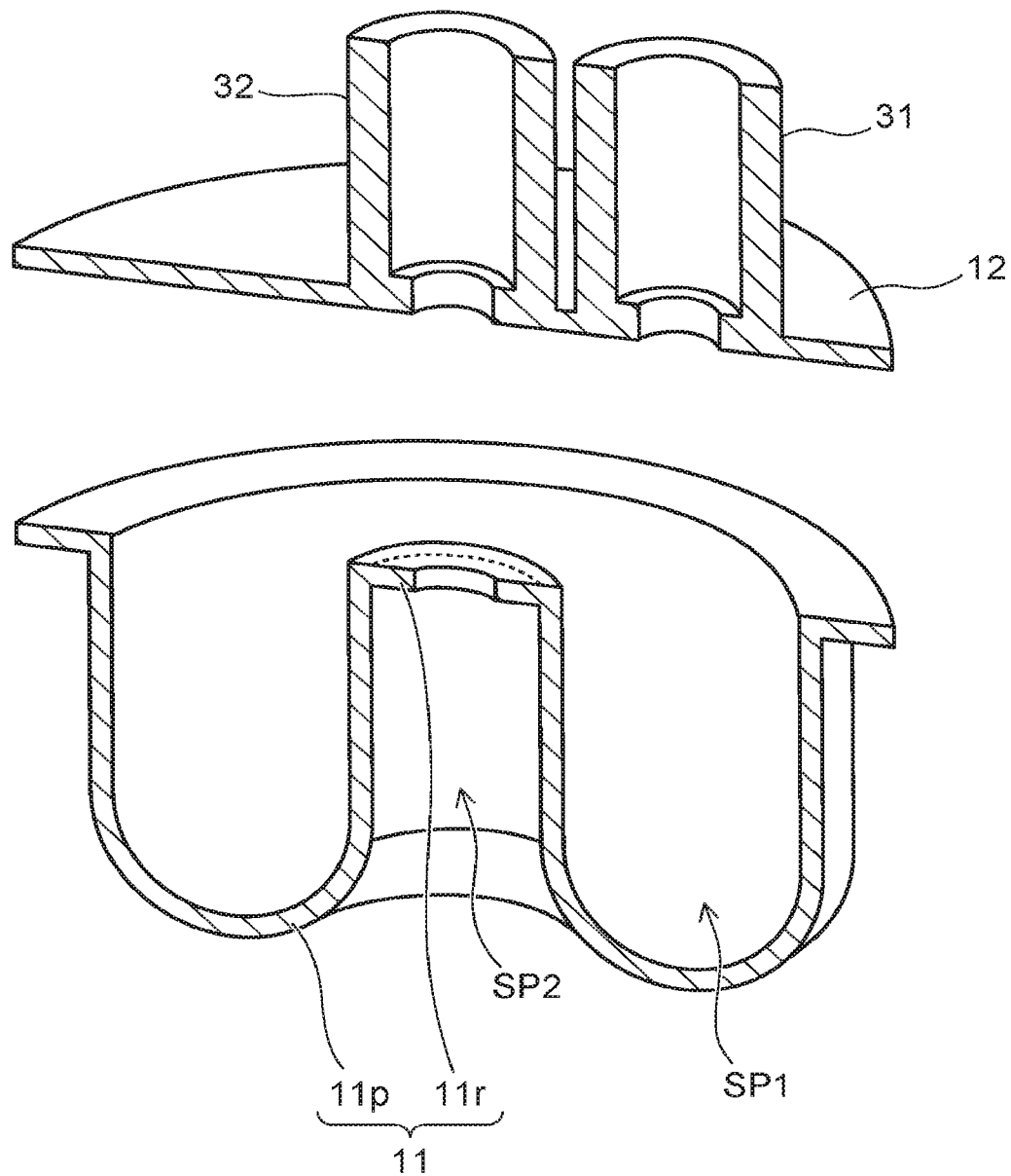
FIG. 2 is a perspective cross-sectional view illustrating the gripper of the gripping tool according to the embodiment.

FIG. 2 is a perspective cross-sectional view illustrating the gripper 10 of the gripping tool 1 according to the embodiment.

The first portion 11 and the second portion 12 of the gripper 10 are illustrated as being separated in FIG. 2.

As illustrated in FIG. 2, the first portion 11 includes a concave portion 11r and a convex portion 11p. The concave portion 11r is recessed upward. The concave portion 11r is provided at the center of the gripper 10. The upper surface of the concave portion 11r contacts the second portion 12. The convex portion 11p protrudes downward. The convex portion 11p is provided around the concave portion 11r. The concave portion 11r and the convex portion 11p are continuous with each other.

The concave portion 11r contacts the second portion 12. The convex portion 11p is separated from the second portion 12 in the vertical direction. In the gripping tool 1 illustrated in FIG. 1 and FIG. 2, the first space SP1 is formed between the convex portion 11p and the second portion 12.

A second space SP2 that is surrounded with the concave portion 11r and the convex portion 11p is formed below the first portion 11. Specifically, the top of the second space SP2 is covered with the concave portion 11r. The side of the second space SP2 is surrounded with the convex portion 11p. The bottom of the second space SP2 is open. As described below, the second space SP2 is sealed from the external space by the workpiece to be gripped being positioned below the second space SP2.

As illustrated in FIG. 1 and FIG. 2, the gripper 10 further includes a first port 31 and a second port 32. The first port 31 communicates with the first space SP1. The second port 32 pierces the second portion 12 and the concave portion 11r of the first portion 11. The second port 32 communicates with the second space SP2. A first pipe 41 for depressurizing the first space SP1 is connected to the first port 31. A second pipe 42 for depressurizing the second space SP2 is connected to the second port 32.

FIGS. 3A to 3D are cross-sectional views illustrating a gripping method using the gripping tool 1 according to the embodiment.

FIGS. 3A to 3D illustrate a case where a workpiece W to be gripped has a cross section in which three triangles are connected.

Figure 3A:
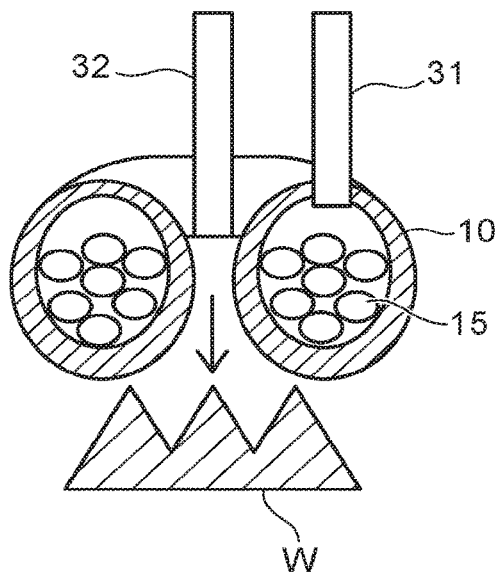
FIGS. 3A to 3D are cross-sectional views illustrating a gripping method using the gripping tool according to the embodiment.

First, the position in the horizontal direction of the gripper 10 and the position in the horizontal direction of the workpiece W are aligned. After aligning the position of the gripper 10 and the position of the workpiece W, the gripper 10 is lowered toward the workpiece W as illustrated in FIG. 3A.

Figure 3B:
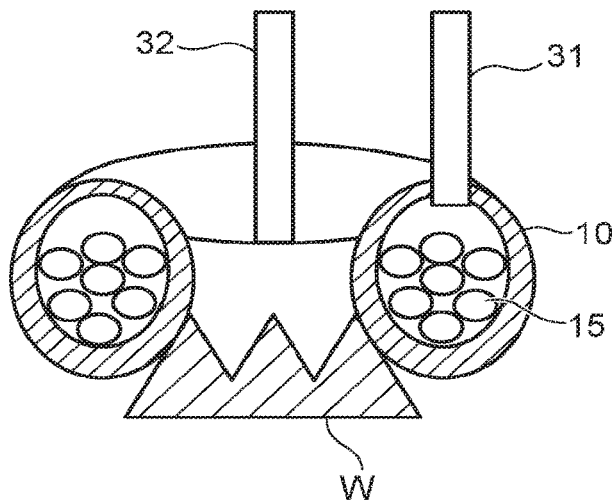

The gripper 10 is flexible. When the gripper 10 contacts the workpiece W, the convex portion 11p of the first portion 11 is pressed outward to envelope the workpiece W as illustrated in FIG. 3B. The second space SP2 that was open is sealed by the workpiece W.

Figure 3C:
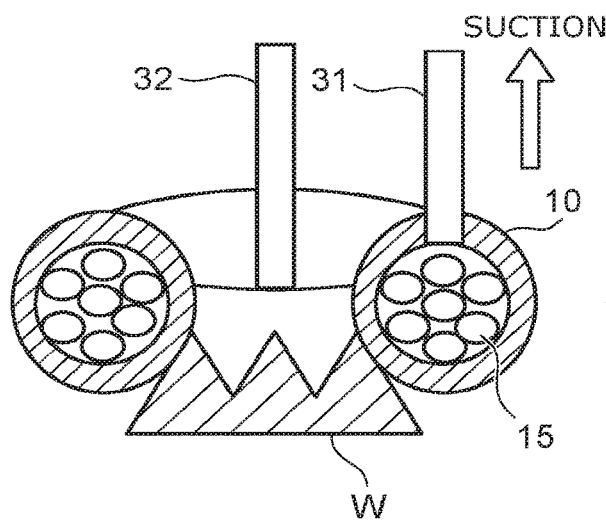

Then, the lowering of the gripper 10 is stopped. As illustrated in FIG. 3C, the first space SP1 is depressurized via the first port 31 and the first pipe 41. For example, the first space SP1 is depressurized to about 0.1 atmosphere. At this time, the granular material 15 in the first space SP1 jams and solidifies. The configuration of the gripper 10 enveloping the workpiece W and in close contact with the workpiece W is fixed thereby; and a force for gripping the workpiece W is generated.

Figure 3D:
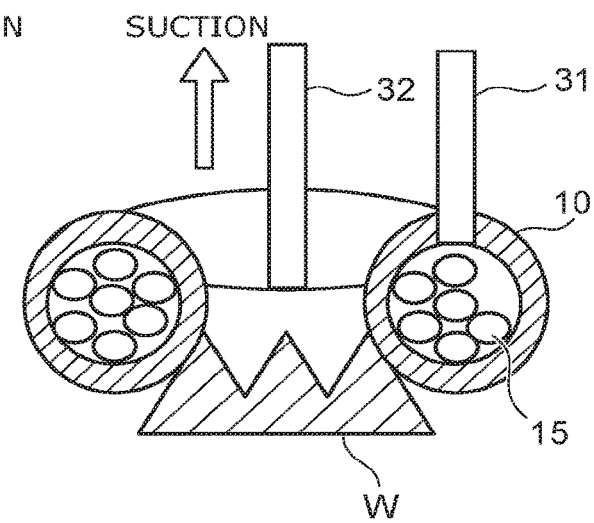

Then, as illustrated in FIG. 3D, the second space SP2 is depressurized via the second port 32 and the second pipe 42. For example, the second space SP2 is depressurized to about 0.1 atmosphere. Thereby, the workpiece W is pulled by suction toward the second space SP2; and the gripping force is increased further.

Subsequently, the gripping tool 1 that grips the workpiece W is raised. The gripping tool 1 is moved in the horizontal direction. After the workpiece W is transferred to the prescribed position, the first space SP1 and the second space SP2 are opened to the atmosphere. Thereby, the gripping force is eliminated; and the workpiece W is released from the gripping tool 1. By the method described above, the workpiece W to be gripped is transferred to the prescribed position.

Figure 4A:
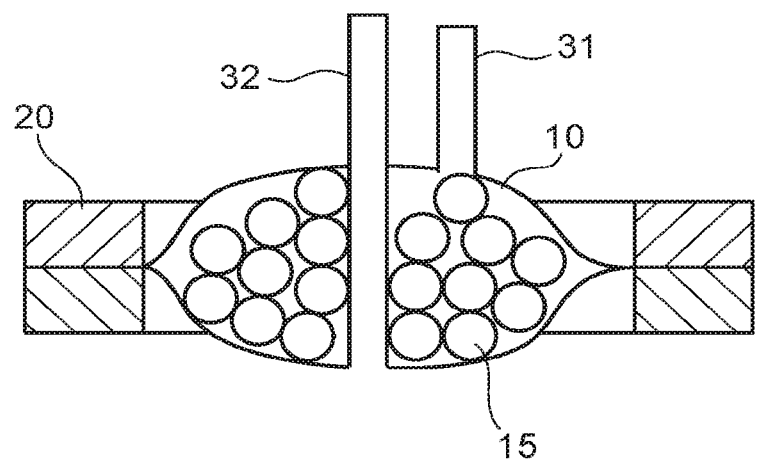
FIGS. 4A to 4C are cross-sectional views illustrating the gripping mechanism of the gripping tool according to the embodiment.
Figure 4B:
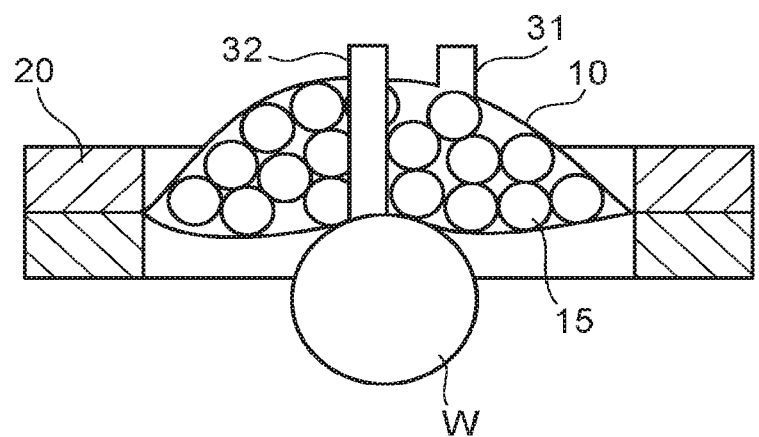
Figure 4C:
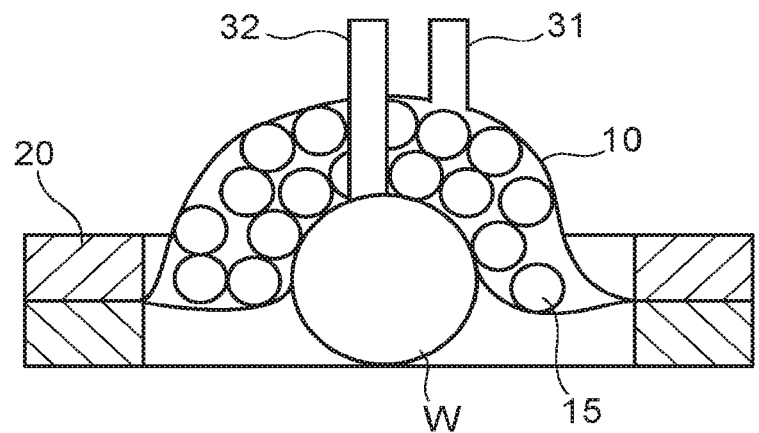

FIGS. 4A to 4C are cross-sectional views illustrating the gripping mechanism of the gripping tool 1 according to the embodiment.

The gripper 10 of the gripping tool 1 is partially simplified in FIGS. 4A to 4C.

In the gripping tool 1 according to the embodiment as illustrated in FIG. 4A, the outer perimeter of the gripper 10 is held by the holder 20. Accordingly, as illustrated in FIG. 4B, the gripper 10 can deform upward with respect to the workpiece W when the gripper 10 is caused to contact the workpiece W.

Air is suctioned via the first port 31 and the second port 32 in this state. Thereby, as illustrated in FIG. 4C, the contact surface area between the gripper 10 and the workpiece W increases while the gripper 10 deforms further upward with respect to the workpiece W.

As described above, the gripper 10 is held by the holder 20 to be deformable upward with respect to the workpiece W. According to this configuration, the gripping force can be increased when the workpiece W is gripped by the gripper 10.

A gripping tool 100 according to a conventional example that is generally sold will now be described with reference to FIG. 5. Comparison results of the gripping forces for the gripping tool 1 according to the embodiment and the gripping tool 100 according to the conventional example will be described with reference to FIG. 6.

Figure 5:
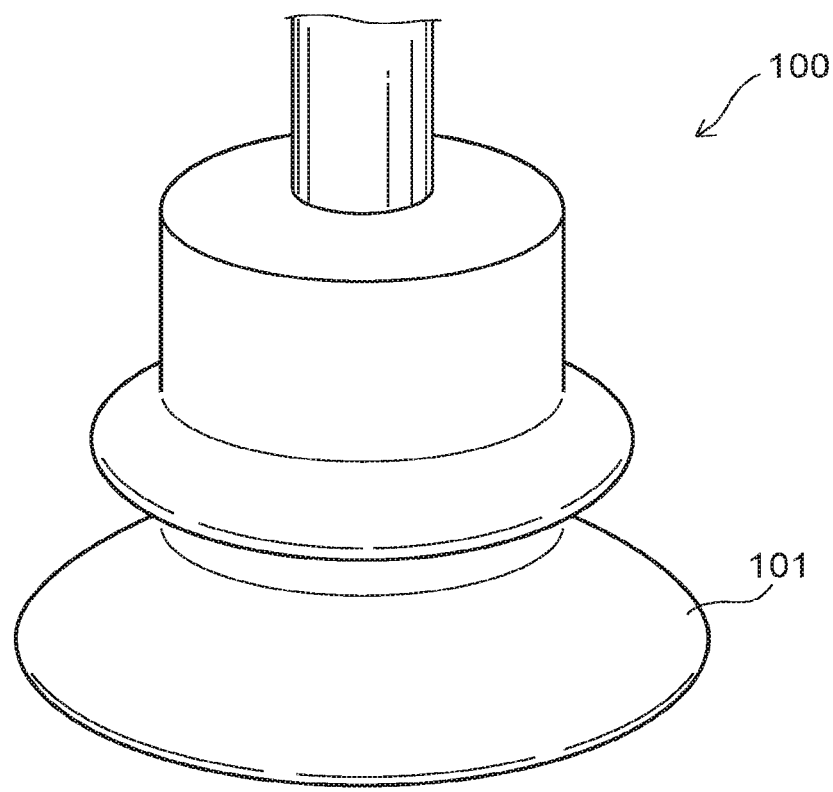
FIG. 5 is a perspective view illustrating the gripping tool according to the conventional example.

FIG. 5 is a perspective view illustrating the gripping tool 100 according to the conventional example.

As illustrated in FIG. 5, the gripping tool 100 includes a suction pad 101. The gripping tool 100 grips the workpiece by causing the suction pad 101 to abut the workpiece to be gripped and by suctioning.

Figure 6:
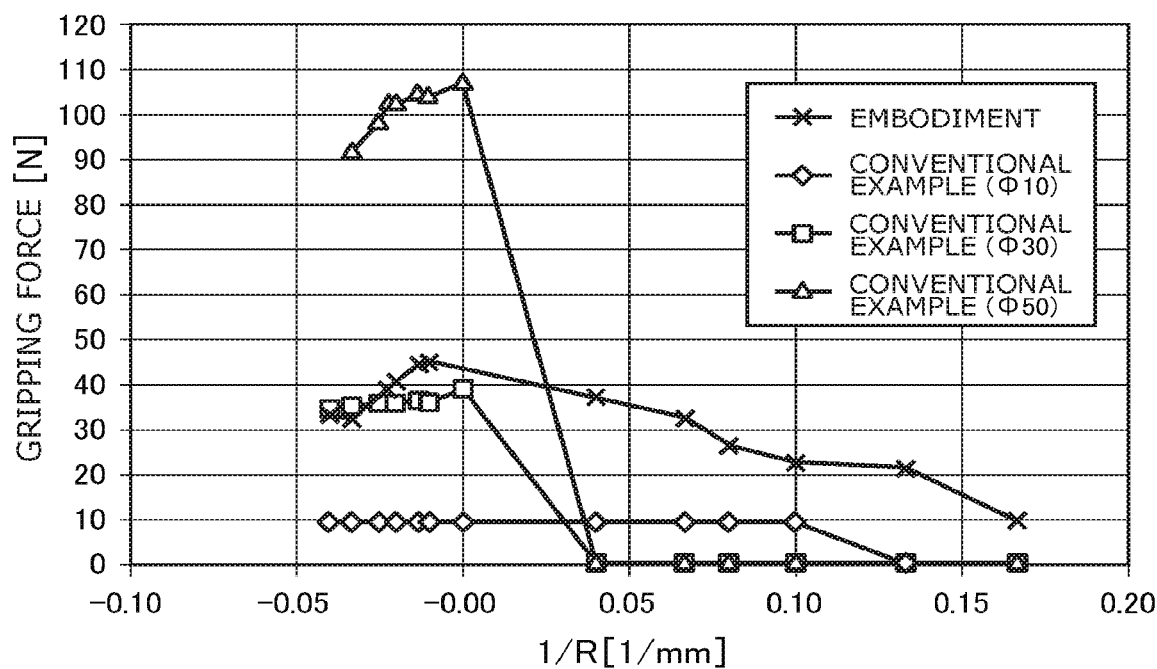
FIG. 6 shows experimental results illustrating the characteristics of the gripping tools according to the embodiment and the conventional example.

FIG. 6 shows experimental results illustrating the characteristics of the gripping tools according to the embodiment and the conventional example.

In FIG. 6, the horizontal axis is the curvature (the reciprocal of a curvature radius R) of the object surface to be gripped. The vertical axis illustrates the gripping force at each curvature. Multiple gripping tools 100 and the gripping tool 1 according to the embodiment are used in the experiment. The diameter of the suction pad 101 is different between the gripping tools 100.

In the experiment, the gripping force was measured using the following procedure.

First, the object to be gripped is placed at the prescribed position. The object is gripped by the gripping tool. The gripping tool is raised at a constant rate while measuring the force applied to the gripping tool. The gripping tool is raised until the gripping tool separates from the object. The maximum value of the measured force is recorded. The experiment is repeated three times for each gripping tool. The average of the measured maximum values is used as the gripping force (N (newtons)).

As illustrated in FIG. 6, a large gripping force is obtained for the workpieces having relatively flat surfaces for the gripping tool 100 including the suction pad 101 having a diameter of 30 cm and the gripping tool 100 including the suction pad 101 having a diameter of 50 cm. When the surface of the workpiece has curvature, the gripping forces of these gripping tools 100 abruptly decrease; and it was difficult to grip the workpieces.

For the gripping tool 100 including the suction pad 101 having a diameter of 10 cm, a similar gripping force is obtained when the surface of the object has a small curvature and when the surface is flat. However, this gripping tool 100 is problematic in that the gripping force is small.

For the gripping tool 1 according to the embodiment, a gripping force substantially equal to that of a flat surface is obtained even in the case where the surface of the object has a small curvature. The gripping force of the gripping tool 1 according to the embodiment is larger than that of the gripping tools 100 in which the diameters of the suction pad 101 are 10 cm and 30 cm; and a sufficient value was obtained.

It can be seen from FIG. 6 that the gripping force of the gripping tool may be greatly dependent not only on the form of the gripping tool but also on the shape of the object to be gripped. For example, the gripping tool 1 according to the embodiment and the gripping tool 100 including the suction pad 101 having the diameter of 50 cm are compared. When the surface of the object has curvature, the gripping force of the gripping tool 1 is larger than that of the gripping tool 100. When the surface of the object is flat, the gripping force of the gripping tool 100 is larger than that of the gripping tool 1. Accordingly, it is a challenge to quantitatively evaluate the gripping performance of the gripping tool.

The inventors of the application devised the method described below as an evaluation method of the gripping performance of the gripping tool.

Figure 7:
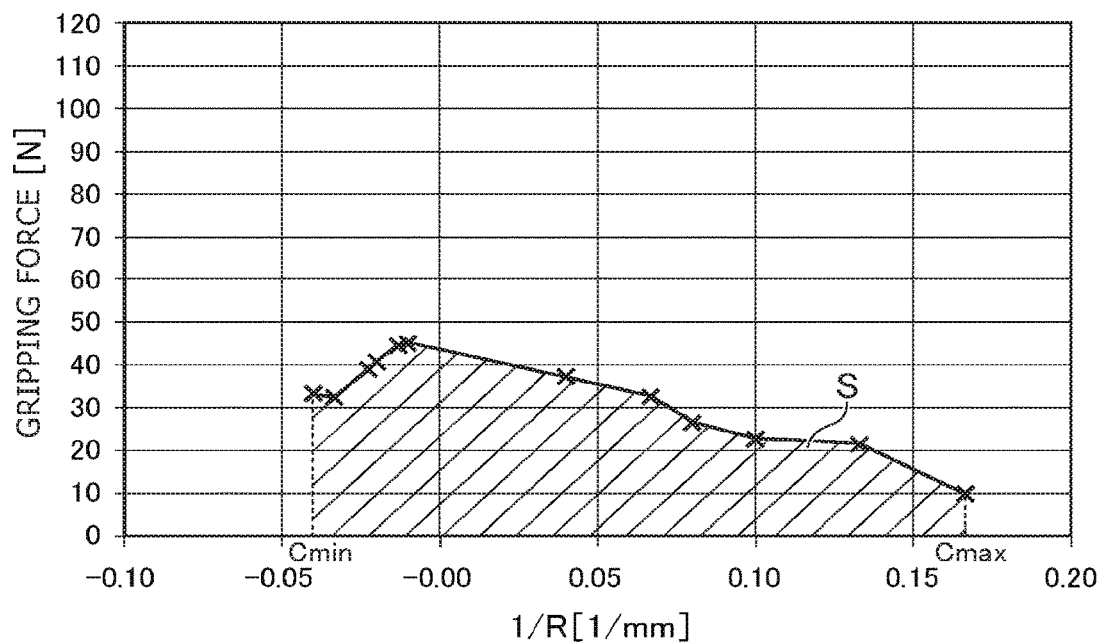
FIG. 7 describes the evaluation method of the gripping performance according to the embodiment.

FIG. 7 describes the evaluation method of the gripping performance according to the embodiment.

The experimental results of the gripping tool 1 according to the embodiment illustrated in FIG. 6 are used in FIG. 7.

First, similarly to the experimental results of FIG. 6, the curvature of the object surface is changed while measuring the gripping force of the gripping tool at each curvature. Then, the integral of the gripping force over the curvature is calculated from the measurement results.

The integral corresponds to calculating the surface area of a region S illustrated in FIG. 7. By plotting the experimental results of the curvature and the gripping force, the region S is surrounded with the horizontal axis, $1/R=C_{min}$, $1/R=C_{max}$, and line segments connecting the gripping forces to each other. $C_{min}$ is the minimum curvature of the curvature $1/R$ for which the measurements of the gripping force are performed. $C_{max}$ is the maximum curvature of the curvature $1/R$ for which the measurements of the gripping force are performed.

The gripping performance of the gripping tool is defined as the calculated integral. According to the evaluation method, the gripping performance of the gripping tool can be evaluated quantitatively and includes the dependence of the gripping force on the shape of the object to be gripped.

Table 1 recited below illustrates the evaluation results of the gripping performance of the gripping tools 100 according to the conventional example and the gripping tool 1 according to the embodiment. The gripping performance of the gripping tool is evaluated using the evaluation method described above based on the experimental results illustrated in FIG. 6.

TABLE 1

|  | UNIT | GRIPPING PERFORMANCE (N/mm) |
| --- | --- | --- |
| CONVENTIONAL EXAMPLE | Φ 10 | 1.50 |
|  | Φ 30 | 2.27 |
|  | Φ 50 | 5.90 |
|  | AVERAGE | 3.22 |
| EMBODIMENT |  | 6.21 |

From Table 1, it can be seen that the value of the gripping performance of the gripping tool 1 according to the embodiment is greater than the values of the gripping performance of the gripping tools according to the conventional example. This shows that the gripping performance of the gripping tool 1 according to the embodiment is superior to those of the gripping tools according to the conventional example.

The inventors discovered in further experiments that the diameter and the shape of the granular material 15 in the gripper 10 interior affects the gripping performance. Therefore, the inventors performed similar experiments for multiple gripping tools 1 having mutually-different diameters and shapes of the granular material 15. The inventors evaluated the gripping performance of each gripping tool 1 using the evaluation method described above.

Figure 8:
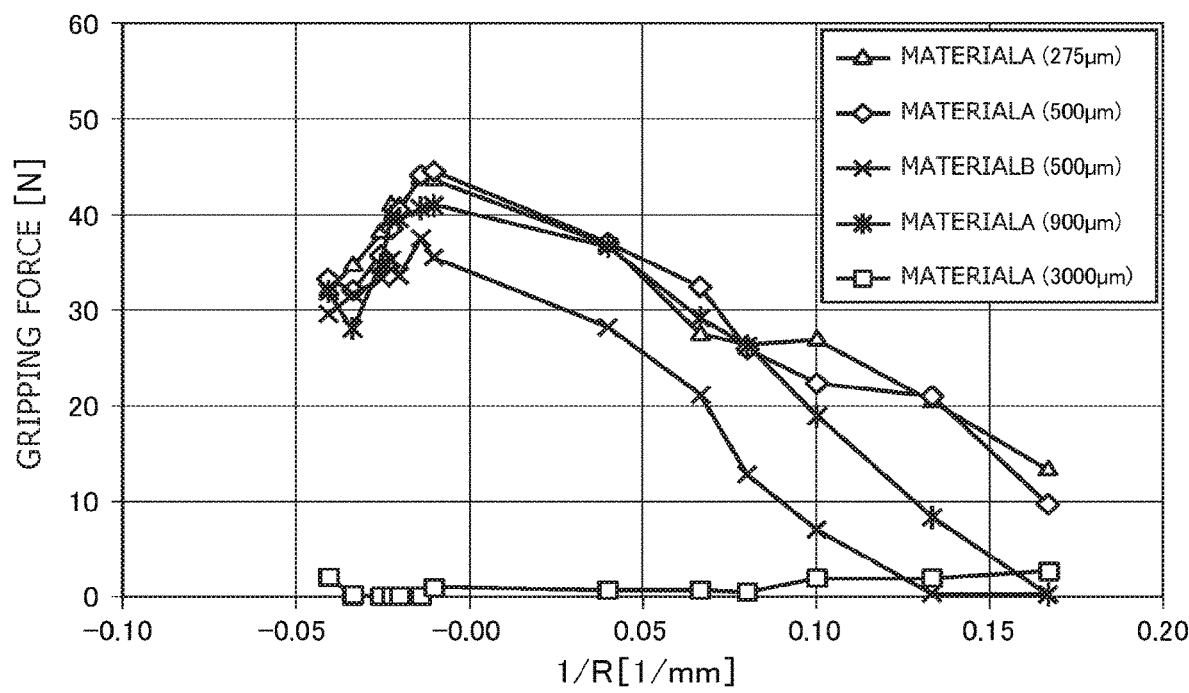
FIG. 8 is an experimental result illustrating the characteristics of the gripping tool according to the embodiment.
Figure 9:
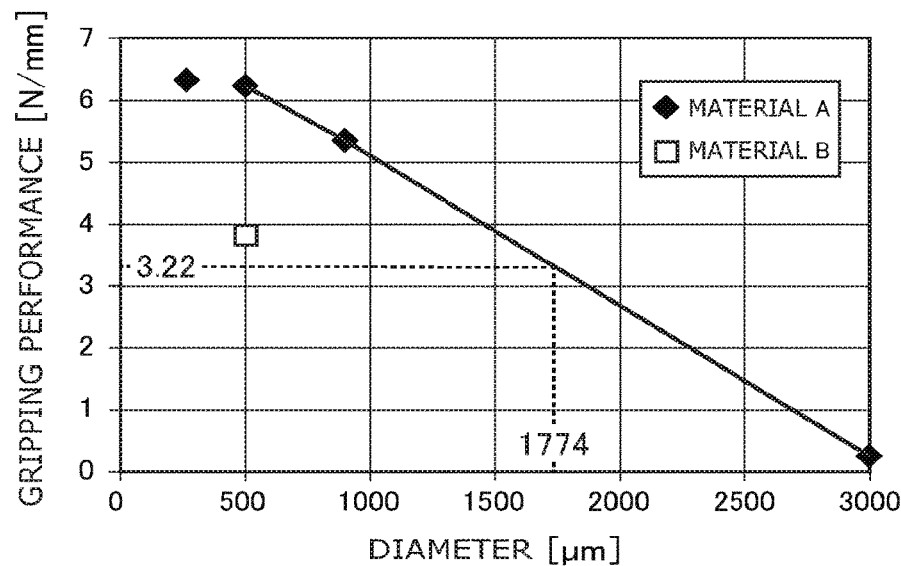
FIG. 9 is an experimental result illustrating the characteristics of the gripping tool according to the embodiment.

FIG. 8 and FIG. 9 are experimental results illustrating the characteristics of the gripping tool 1 according to the embodiment.

In FIG. 8, the horizontal axis and the vertical axis are respectively the curvature and the gripping force similarly to FIG. 6. In FIG. 9, the horizontal axis is the diameter of the granular material 15; and the vertical axis is the gripping performance.

For example, microbeads, silicone resin beads, coffee beans, glass beads, etc., can be used as the granular material 15. In the experiment, a spherical first granular material and an angular second granular material are used. The spherical first granular material includes one material (a material A) selected from the group consisting of microbeads, silicone resin beads, coffee beans, and glass beads. The angular second granular material includes another one material (a material B) selected from the group recited above. FIG. 8 illustrates the change of the gripping performance of the gripping tool 1 as the diameter of the first granular material is changed, and the gripping performance of the gripping tool 1 in the case where the second granular material is used. In FIG. 8, the numerical value in parentheses beside the material illustrates the diameter of the first granular material. An intermediate value between the minimum diameter and the maximum diameter of the second granular material was used as the diameter of the second granular material.

From the experimental results of FIG. 8, it can be seen that a high gripping force is obtained at each curvature as the diameter of the granular material 15 decreases. For the first granular material and the second granular material 15, it can be seen that a higher gripping force is obtained for the first granular material than for the second granular material. The gripping performance was calculated for each diameter based on the experimental results of FIG. 8. FIG. 9 illustrates the calculation results. From the results of FIG. 9, it can be seen that a higher gripping performance is obtained when the granular material 15 is spherical and the diameter of the granular material 15 is smaller.

As illustrated in Table 1, the average gripping performance of the gripping tools 100 according to the conventional example that are generally sold is 3.22 (N/mm). Comparing this result to the experimental results of FIG. 9, it can be seen that the diameter of the gripping tools 100 according to the conventional example corresponds to 1774 μm. Accordingly, the gripping tool 1 that has a higher gripping performance than the average gripping tool according to the conventional example is obtained by setting the diameter of the granular material 15 to be less than 1774 μm.

From the results of Table 1 and FIG. 9, it can be seen that the gripping performance obtained when the granular material 15 is spherical and the diameter is 500 μm or less is superior to the highest gripping performance of the gripping tools 100 according to the conventional example. Accordingly, it is more desirable for the granular material 15 to be spherical and to have a diameter of 500 µm or less.

Figure 10:
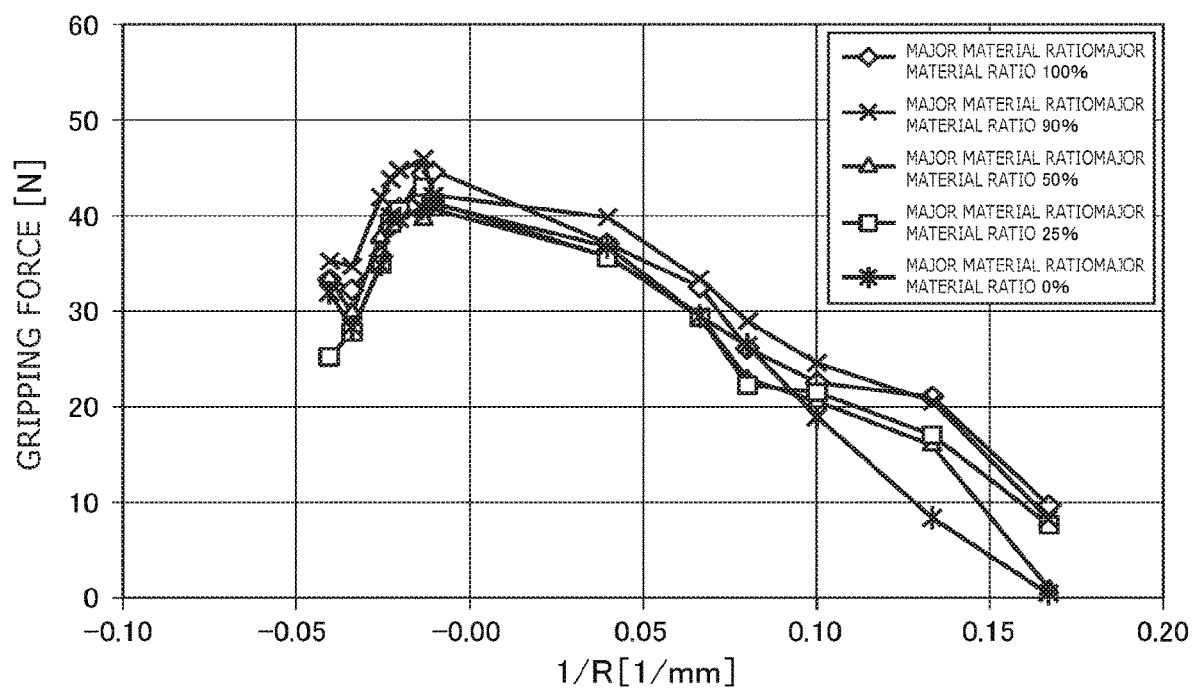
FIG. 10 shows experimental results illustrating other characteristics of the gripping tool according to the embodiment.

FIG. 10 shows experimental results illustrating other characteristics of the gripping tool according to the embodiment.

FIG. 10 illustrates the experimental results in the case where the granular materials 15 having mutually-different diameters are mixed. In this experiment, a granular material having a diameter of 500 µm and a granular material having a diameter of 900 µm were mixed; and the proportion of the granular material (the major material) having the diameter of 500 µm was changed.

From the experimental results of FIG. 10, a large change of the gripping force is not seen even in the case where the granular materials having different diameters are mixed. This result shows that the gripping tool 1 that has a high gripping performance is obtained when the diameter of at least a portion of the multiple granular materials 15 is in the range described above.

The range of the diameter of the granular material 15 described above can be used favorably by the gripping tool 1. In the gripping tool 1 as illustrated in the gripping mechanism of FIGS. 4A to 4C, the gripper 10 is deformable upward with respect to the workpiece W. In the case where the gripper 10 is deformable upward with respect to the workpiece W, the diameter of the granular material 15 greatly affects the deformation amount of the gripper 10. The contact surface area between the first portion 11 and the workpiece W increases as the deformation amount of the gripper 10 increases. Accordingly, the gripping performance of the gripping tool 1 can be improved further by setting the diameter of at least a portion of the granular material 15 of the gripping tool 1 to be less than 1774 µm (more desirably 500 µm or less).

The gripping tool according to the embodiment is not limited to the gripping tool illustrated in FIG. 1 and FIG. 2. As described below, various modifications of the gripping tool according to the embodiment are applicable. In the gripping tools described below as well, the gripping performance of the gripping tool can be improved by setting the diameter of at least a portion of the granular material 15 to be in the range described above.

Figure 11:
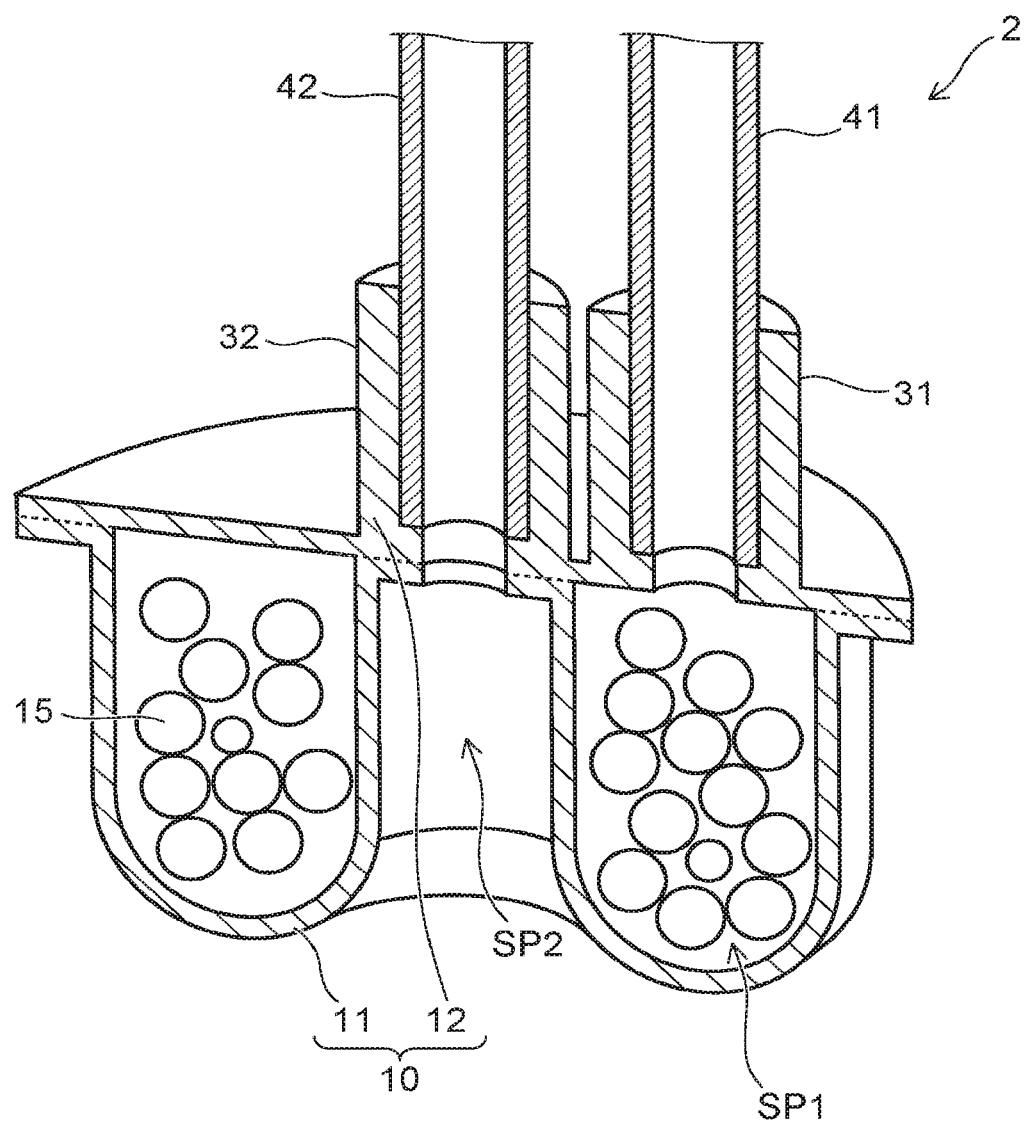
FIG. 11 is a perspective cross-sectional view illustrating a gripping tool according to a first modification of the embodiment.

FIG. 11 is a perspective cross-sectional view illustrating a gripping tool 2 according to a first modification of the embodiment.

The gripping tool 2 illustrated in FIG. 11 differs from the gripping tool 1 in that the holder 20 is not included. Therefore, the outer perimeter of the first portion 11 and the outer perimeter of the second portion 12 are fixed by being bonded to each other.

Figure 12:
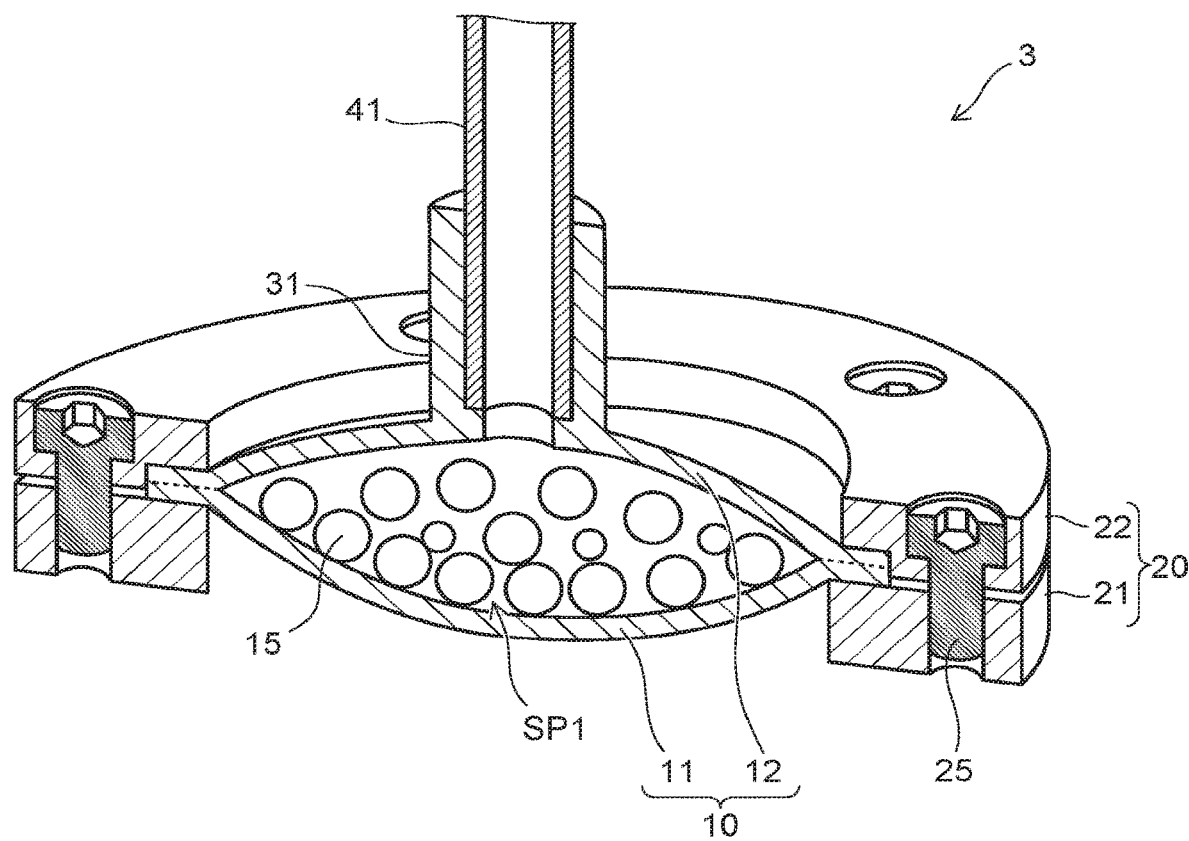
FIG. 12 is a perspective cross-sectional view illustrating a gripping tool according to a second modification of the embodiment.

FIG. 12 is a perspective cross-sectional view illustrating a gripping tool 3 according to a second modification of the embodiment.

In the gripping tool 3 illustrated in FIG. 12, compared to the gripping tool 1, the configuration of the gripper 10 is different; and the second port 32 is not included.

In the gripper 10, the first portion 11 is curved to be convex downward. The second portion 12 is curved to be convex upward. The granular material is provided in the first space SP1 between the first portion 11 and the second portion 12.

Unlike the gripping tool 1 illustrated in FIG. 1, the first portion 11 of the gripping tool 3 does not include the concave portion 11r and the convex portion 11p. Therefore, in the gripping tool 3, the second space SP2 is not formed below the first portion 11. The second port 32 is not provided. In the gripping tool 3 according to the modification as well, similarly to the mechanism illustrated in FIGS. 3A to 3D, the gripper 10 is deformable upward with respect to the workpiece W when gripping the workpiece W. The gripping force of the gripper 10 can be increased thereby.

Figure 13:
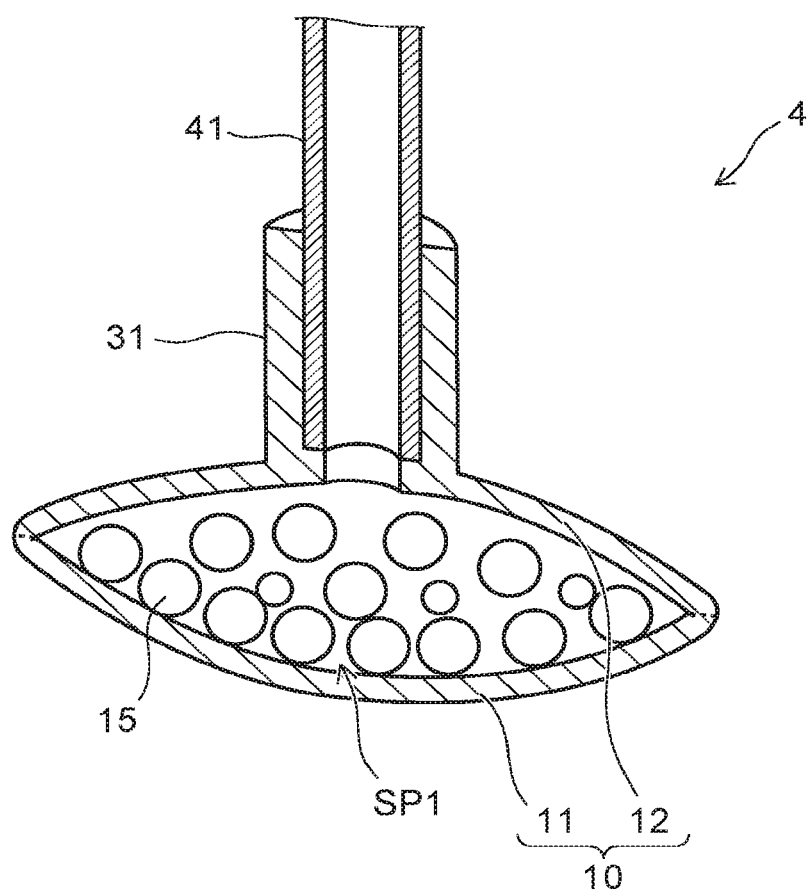
FIG. 13 is a perspective cross-sectional view illustrating a gripping tool according to a third modification of the embodiment.

FIG. 13 is a perspective cross-sectional view illustrating a gripping tool 4 according to a third modification of the embodiment.

The gripping tool 4 illustrated in FIG. 13 differs from the gripping tool 3 in that the holder 20 is not included. The outer perimeter of the first portion 11 and the outer perimeter of the second portion 12 are fixed by being bonded to each other.

Figure 14:
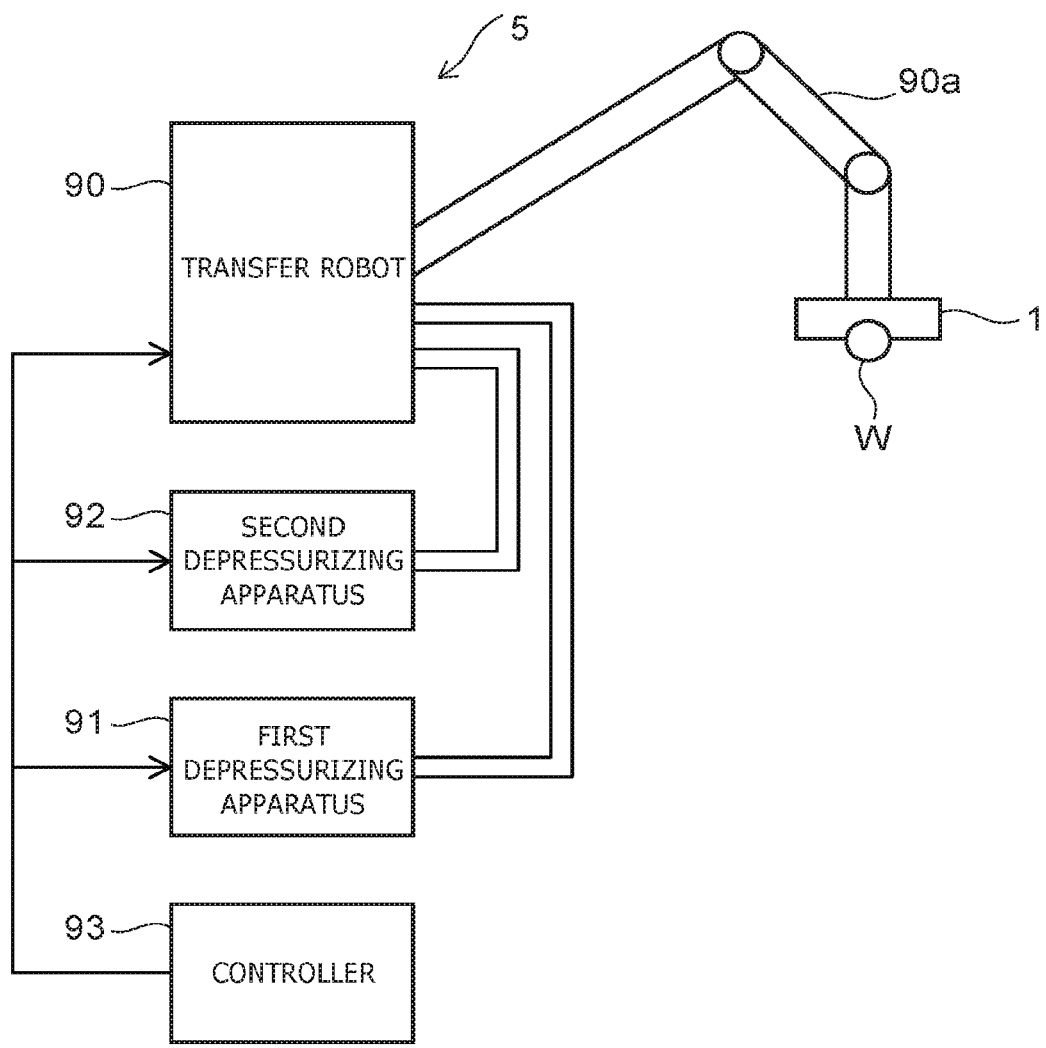
FIG. 14 is a schematic view illustrating a gripping system 5 according to the embodiment.

FIG. 14 is a schematic view illustrating a gripping system 5 according to the embodiment.

The gripping system 5 of the embodiment includes the gripping tool 1, a transfer robot 90, a first depressurizing apparatus 91, a second depressurizing apparatus 92, and a controller 93.

The transfer robot 90 includes an arm 90a. For example, the arm 90a includes multiple joints. The gripping tool 1 is mounted to the tip of the arm 90a. The transfer robot 90 operates the arm 90a according to a command from the controller 93 and grips and transfers the workpiece W.

The first depressurizing apparatus 91 and the second depressurizing apparatus 92 include vacuum pumps. The first depressurizing apparatus 91 is connected to the first pipe 41 of the gripping tool 1 illustrated in FIG. 1. The second depressurizing apparatus 92 is connected to the second pipe 42 of the gripping tool 1. The first depressurizing apparatus 91 and the second depressurizing apparatus 92 are driven according to commands from the controller 93. Thereby, the first space SP1 and the second space SP2 are depressurized or opened to the atmosphere.

The controller 93 includes a CPU (Central Processing Unit), ROM (Read Only Memory), nonvolatile flash memory, etc. Various processing of the controller 93 is performed by the CPU. Various control algorithms, various constants, and the like that are necessary for the operation of the gripping system 5 are stored in the ROM. The transfer procedure, the transfer conditions, and the like of the workpiece W are stored as appropriate in the flash memory.

According to the transfer procedure stored in the flash memory, the controller 93 sends commands to control the operations of the transfer robot 90, the first depressurizing apparatus 91, and the second depressurizing apparatus 92.

Because the gripping system 5 includes the gripping tool 1 having a high gripping performance, the workpiece W can be gripped and transferred more reliably.

The gripping system 5 according to the embodiment may include any of the gripping tools 2 to 4 according to the modifications described above instead of the gripping tool 1. In the case where the gripping system 5 includes the gripping tool 3 or 4, the gripping system 5 may not include the second depressurizing apparatus 92.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A gripping tool, comprising:
a gripper, the gripper being flexible;
a plurality of granular materials being provided in an interior of the gripper,
the gripping tool being configured to grip a workpiece by depressurizing the interior of the gripper in a state in which the gripper is caused to contact the workpiece,
a diameter of at least a portion of the granular materials being less than 1774 μm, wherein
the gripper includes:
a first portion being configured to contact the workpiece: and
a second portion opposing the first portion,
the first portion includes:
a concave portion recessed toward a first direction, the first direction being from the first portion toward the second portion; and
a convex portion protruding toward a second direction opposite to the first direction and being provided around the concave portion,
the granular materials are provided between the convex portion and the second portion,
the gripping tool further comprises a second space port communicating with a second space surrounded with the concave portion and the convex portion,
the second space port penetrates the second portion and the concave portion, and
a dimension of the concave portion in a direction perpendicular to the first direction is longer than a dimension of the penetrated part of the second portion in the direction.

2. The tool according to claim 1, wherein the diameter of the at least a portion of the granular materials is 500 μm or less, and
the at least a portion of the granular materials is spherical.

3. The tool according to claim 1, further comprising
a first space port communicating with a first space, a first pipe being connected to the first space port and configured to depressurize the first space,
a second pipe being connected to the second space port and configured to depressurize the second space.

4. The tool according to claim 1, wherein the first portion and the second portion are configured to be deformable along a line direction connecting the first portion and the second portion.

5. The tool according to claim 1, further comprising a holder holding an outer perimeter of the first portion and an outer perimeter of the second portion,
the gripper being deformable along a line direction connecting the first portion and the second portion.

6. The tool according to claim 5, wherein the first portion and the second portion are flexible.

7. The tool according to claim 6, wherein the workpiece is gripped by depressurizing the first space in a state in which the first portion is deformed by being caused to contact the workpiece.

8. The tool according to claim 7. wherein when the first portion is deformed by being caused to contact the workpiece, the second portion is more deformable than the holder toward a first direction, the first direction being from the first portion toward the second portion.

9. A gripping system, comprising:
a robot mechanism including an arm;
the tool according to claim 1 mounted to a tip of the arm;
a first depressurizing apparatus connected to the first space and configured to depressurize the first space; and
a controller controlling operations of the robot mechanism and the first depressurizing apparatus.

10. A gripping tool, comprising:
a gripper including a first portion and a second portion and being flexible;
a plurality of granular materials provided in a first space between the first portion and the second portion;
a first port; and
a second port,
the first portion being configured to contact a workpiece and including
a concave portion recessed toward a first direction, the first direction being from the first portion toward the second portion, and
a convex portion protruding toward a second direction opposite to the first direction and being provided around the concave portion,
the first port communicating with the first space;
a first pipe being connected to the first space and configured to depressurize the first space,
the second port having a hole piercing the concave portion and the second portion along the first direction,
a second pipe being connected to the second port and configured to depressurize a second space surrounded with the concave portion and the convex portion,
the gripping tool being configured to grip the workpiece by depressurizing the first space in a state in which the first portion is deformed by being caused to contact the workpiece,
in a state in which the first portion does not contact the workpiece, a dimension in a perpendicular direction of the concave portion being longer than a dimension in the perpendicular direction of the hole, the perpendicular direction being perpendicular to the first direction,
the granular materials being provided between the convex portion and the second portion,
a diameter of at least a portion of the granular materials being less than 1774 μm.

11. The tool according to claim 10, further comprising a holder holding an outer perimeter of the first portion and an outer perimeter of the second portion,
the gripper being deformable along a line direction connecting the first portion and the second portion.

12. The tool according to claim 10, wherein
a diameter of the at least a portion of the granular materials is 500 μm or less, and
the at least a portion of the granular materials is spherical.

13. An evaluation method of gripping performance of a gripping tool being configured to grip and lift an object, the method comprising:
changing a curvature of an object to be gripped while measuring a gripping force of the gripping tool at each of the curvatures; and
defining an integral of the gripping force over the curvature to be the gripping performance and evaluating the gripping performance of the gripping tool, wherein the gripping tool includes:
a gripper including
a first portion being configured to contact the object and being flexible,
a second portion opposing the first portion and being flexible, and a plurality of granular materials provided in a first space between the first portion and the second portion, a holder holding an outer perimeter of the first portion and an outer perimeter of the second portion, the gripping tool grips the object by solidifying the granular materials by depressurizing the first space in a state in which the first portion is deformed by being caused to contact the object, when the first portion is deformed by being caused to contact the object, the second portion is more deformable than the holder in a first direction, the first direction being from the first portion toward the second portion, and a diameter of at least a portion of the granular materials is changed while evaluating the gripping performance at each diameter.

\* \* \* \* \*